(12) United States Patent
Finkel et al.

(10) Patent No.: US 9,793,816 B2
(45) Date of Patent: Oct. 17, 2017

(54) METHOD AND CIRCUIT FOR PEAK POWER IN QUASI-RESONANT CONVERTERS

(71) Applicant: SEMICONDUCTOR COMPONENTS INDUSTRIES, LLC, Phoenix, AZ (US)

(72) Inventors: Alan David Finkel, Chandler, AZ (US); Armando Gabriel Mesa, Jr., Tempe, AZ (US)

(73) Assignee: SEMICONDUCTOR COMPONENTS INDUSTIRES, LLC, Phoenix, AZ (US)

( * ) Notice: Subject to any disclaimer, the term of this patent is extended or adjusted under 35 U.S.C. 154(b) by 0 days.

(21) Appl. No.: 15/094,912

(22) Filed: Apr. 8, 2016

(65) Prior Publication Data
US 2017/0264201 A1    Sep. 14, 2017

Related U.S. Application Data

(60) Provisional application No. 62/306,142, filed on Mar. 10, 2016.

(51) Int. Cl.
*H02M 3/335* (2006.01)

(52) U.S. Cl.
CPC ... *H02M 3/33515* (2013.01); *H02M 3/33507* (2013.01); *Y02B 70/1433* (2013.01)

(58) Field of Classification Search
CPC ..... H02M 2001/0058; H02M 3/33507; H02M 3/33515; Y02B 70/1416; Y02B 70/1433
See application file for complete search history.

(56) References Cited

U.S. PATENT DOCUMENTS

| | | | |
|---|---|---|---|
| 6,346,801 B1* | 2/2002 | Zafarana | H02M 3/157 323/224 |
| 6,411,064 B1* | 6/2002 | Brink | A61N 1/3975 320/166 |
| 7,239,119 B2 | 7/2007 | Baurle et al. | |
| 7,433,211 B1* | 10/2008 | Collmeyer | H02M 1/4225 323/282 |
| 7,538,533 B2 | 5/2009 | Baurle et al. | |
| 8,552,695 B2* | 10/2013 | Stracquadaini | H02M 3/33507 323/207 |

(Continued)

*Primary Examiner* — Fred E Finch, III
(74) *Attorney, Agent, or Firm* — Robert F. Hightower

(57) ABSTRACT

Implementations of the present disclosure involve a circuit and/or method for a control circuit of a switched-mode power supply that allows the power supply circuit to temporarily provide up to 2.0× the nominal maximum power rating of the circuit without the need for large storage devices within the power supply. For example, a control circuit of a switched-mode power supply may cause the power supply to operate in a quasi-resonant mode. However, when the load on the circuit increases such that the feedback voltage measurement meets or exceeds a voltage threshold, the control circuit causes the switched-mode power supply to enter a power excursion mode with a fixed switching frequency. If the load on the switched-mode power supply continues to increase, the off time of the switched-mode power supply may be scaled in response to increase the power provided by the switched-mode power supply.

26 Claims, 8 Drawing Sheets

(56) References Cited

U.S. PATENT DOCUMENTS

| | | | | |
|---|---|---|---|---|
| 2002/0186571 | A1* | 12/2002 | Tsuge | H02M 3/3385 363/21.01 |
| 2006/0002155 | A1* | 1/2006 | Shteynberg | H02M 1/4258 363/21.12 |
| 2008/0061746 | A1* | 3/2008 | Kobayashi | H02M 3/33507 320/166 |
| 2010/0219802 | A1* | 9/2010 | Lin | H02M 3/33507 323/284 |
| 2010/0302812 | A1* | 12/2010 | Moon | H02M 3/33507 363/21.01 |
| 2011/0150521 | A1* | 6/2011 | Uchiyama | G03G 15/80 399/88 |
| 2012/0275199 | A1* | 11/2012 | Li | H02M 3/33507 363/21.15 |
| 2014/0016365 | A1* | 1/2014 | Maruyama | H02M 3/33507 363/21.02 |
| 2015/0002109 | A1* | 1/2015 | Bianco | H02M 1/4208 323/210 |
| 2015/0188428 | A1* | 7/2015 | Leung | H02M 3/156 323/271 |
| 2015/0236598 | A1* | 8/2015 | Krueger | H02M 3/33507 363/21.17 |
| 2015/0244275 | A1* | 8/2015 | Hinz | H02M 3/33507 363/21.17 |
| 2015/0311778 | A1* | 10/2015 | Chang | H02M 1/143 363/21.16 |
| 2016/0294282 | A1* | 10/2016 | Herfurth | H02M 3/157 |

* cited by examiner

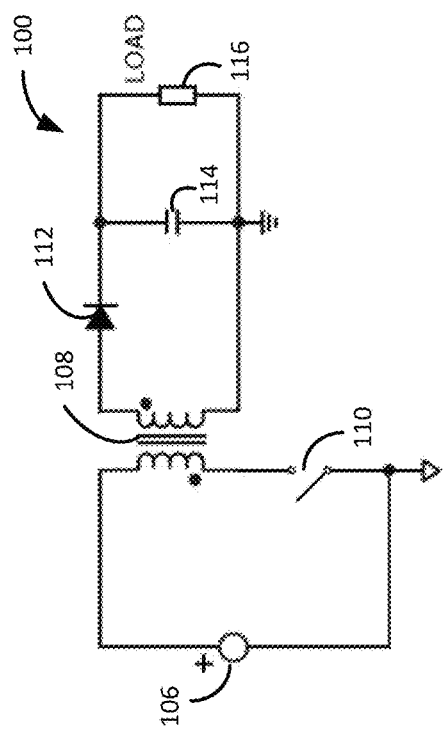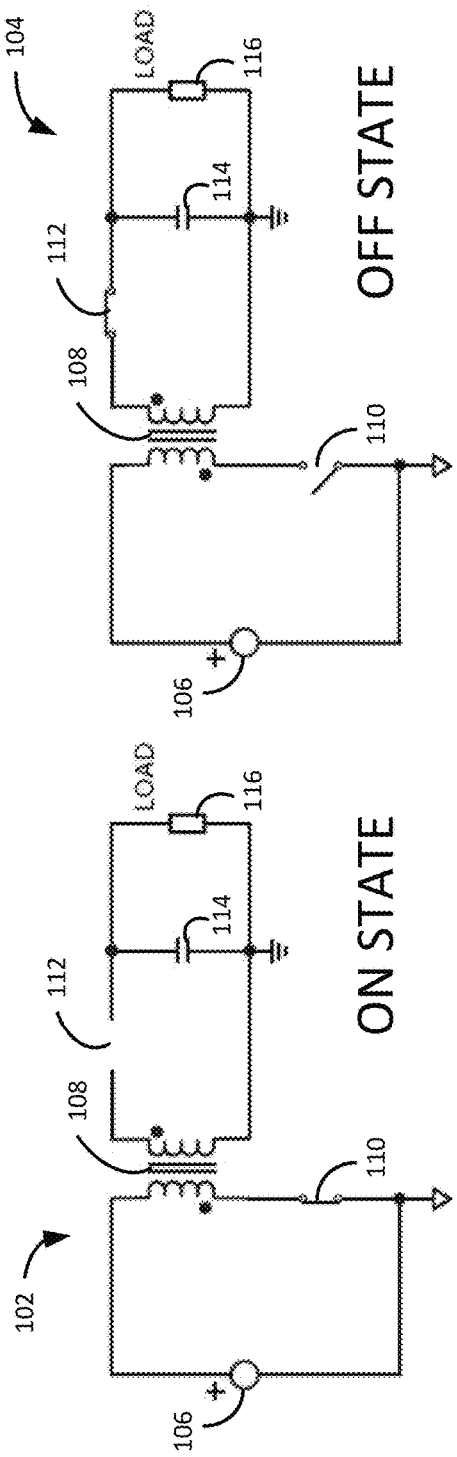

METHOD AND CIRCUIT FOR PEAK POWER IN QUASI-RESONANT CONVERTERS

CROSS-REFERENCE TO RELATED APPLICATION

This application claims priority to U.S. Provisional Application No. 62/306,142, filed on Mar. 10, 2016, entitled "Method and Circuit for Peak Power in Quasi-Resonant Converters," invented by Alan David Finkel and Armando Gabriel Mesa, Jr., and is incorporated herein by reference and priority thereto for common subject matter is hereby claimed.

FIELD OF THE DISCLOSURE

Aspects of the present invention relate to computing systems and, more particularly, aspects of the present invention involve a method and/or circuit for achieving peak power of a switched mode power supply circuit.

BACKGROUND

Many electronic components or devices utilize an electronic power supply circuit to aid in providing power during operation of the device. However, the amount of power necessary to operate the electronic device may vary depending on the load placed on the power supply. For example, a computer may place a higher load on the power supply during boot-up of the system and a lower load on the supply when the system is idle. In many systems, the power supply may incorporate a power converter circuit that is designed to respond to the various load requirements of the electronic device on the power supply of the device. One particular voltage converter circuit that may be incorporated into an electronic device is known as a switched-mode power supply (SMPS). In general, SMPS circuits operate to transfer power from a power source to a load of the electronic device by switching between a full-on mode (providing power to a power storage device) and a full-off mode (providing no power to the power storage device). Such a design allows for higher power conversion efficiency through a smaller and lighter design.

Peak power requirements of many electronic devices are approaching 2× the nominal maximum rated power of the device for short periods of time. For example, a computer may require 65 W of power continuous power to operate, but may also require up to 130 W momentarily during high load conditions. In response, many power supplies are designed for the peak power requirements that may require utilizing larger and/or more expensive components of the power supply circuit at an increased cost. In some instances, such changes to the components used in the circuit result in the power supply circuits being no longer useful or economical with the electronic device. It is with these and other issues that various aspects of the present disclosure were developed.

SUMMARY

One implementation of the present disclosure may take the form of a method for controlling a switched-mode power supply. The method includes the operations of measuring and storing a switch off-time duration during a nominal load condition of the switched-mode power supply, detecting a peak power excursion condition of the switched-mode power supply, and setting a switching frequency of the switched-mode power supply by equating the switch off-time to the stored off-time duration. The method further includes the operations of detecting an increase in the load requirement during the peak power excursion condition and adjusting the off-time of the switched-mode power supply by a scaling factor in response to a change in load requirement during the detected peak power excursion condition.

Another implementation of the present disclosure may take the form of a control circuit for a switched-mode power supply. The control circuit comprises a switch controller for operating the switched-mode power supply in an on-state or an off-state, a counter circuit for timing a duration of an off-state during a nominal load condition of the switched-mode power supply, and a register in communication with the counter circuit for storing the off-time duration during the nominal load condition. The control circuit also includes a peak power excursion detection circuit for detecting a peak power excursion condition of the switched-mode power supply such that, after the peak power excursion condition of the switched-mode power supply is detected, a switching frequency of the switch controller is based on the off-time duration stored in the register.

Yet another implementation of the present disclosure may take the form a switched-mode power supply circuit for powering a load. The switched-mode power supply circuit may include a switching circuit for operating the switched-mode power supply in an on-state or an off-state, wherein power is stored in a power storage circuit during the on-state, a switch controller for operating the switching circuit such that the switched-mode power supply alternates between the on-state and the off-state at a switching frequency, and a counter circuit for timing a duration of a particular off-state during a nominal load condition of the switched-mode power supply. The power supply circuit may also include a register in communication with the counter circuit for storing the off-time duration of the particular off-state during the nominal load condition and a peak power excursion detection circuit for detecting a peak power excursion condition of the switched-mode power supply. When the peak power excursion condition of the switched-mode power supply is detected, the switching frequency of the switch controller is based on the off-time duration stored in the register.

BRIEF DESCRIPTION OF THE DRAWINGS

The present disclosure can be better understood with reference to the following drawings. The elements of the drawings are not necessarily to scale, emphasis instead being placed upon clearly illustrating the principles of the present disclosure. Furthermore, like referenced numerals designate corresponding parts throughout the several views.

FIGS. 1A-1C are schematics of a simplified switched-mode power supply circuit.

DETAILED DESCRIPTION

Figure 2A:
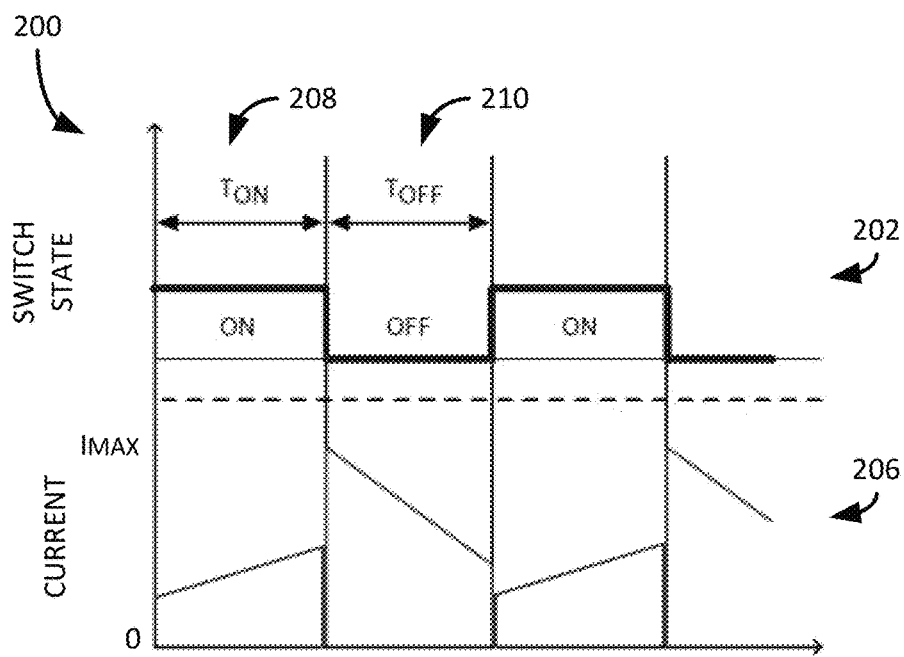
FIG. 2A is a graph illustrating the operation of a switched-mode power supply circuit that is operating in a continuous conduction mode.

Implementations of the present disclosure involve a circuit and/or method for a control circuit of a switched-mode power supply that allows the power supply circuit to temporarily provide up to 2.0× the nominal maximum power rating of the circuit without the need for large storage devices within the power supply. Control of the switched-mode power supply occurs by controlling the switching frequency of a switching device of the power supply. In one particular implementation, the control circuit of the switched-mode power supply may cause the power supply to operate in a quasi-resonant mode while a threshold voltage measurement based on a load on the circuit is low. When the load on the circuit increases such that the feedback voltage measurement meets or exceeds the voltage threshold, the control circuit causes the switched-mode power supply to enter a power excursion mode. In the power excursion mode, the switching frequency of the switched-mode power supply is fixed to a stored value. In some embodiments, if the load on the switched-mode power supply continues to increase, the off time of the switched-mode power supply may be scaled in response to increase the power provided by the switched-mode power supply. The control circuit may also cause the switched-mode power supply to return to the power excursion mode and the quasi-resonant mode when the load on the switched-mode power supply decreases.

FIGS. 1A-1C are schematics of a simplified switched-mode power supply circuit. In general, the circuits 100-104 illustrated may include many more components than are shown in the Figures. However, the circuits 100-104 are provided as a simple way to understand the basic operation of a switched-mode power supply (SMPS) circuit. Those of skill in the art will recognize the various other components and/or designs which may be included in a SMPS circuit. As such, it should be appreciated that the operations and circuits described herein for operating a SMPS should not be limited to the circuits of FIGS. 1A-1C. Rather, the operations and circuits may be used in connection with any type of SMPS circuit.

In general, an SMPS transfers power from a source to a load, such as a personal computer or other computing device, while converting voltage and current characteristics of the provided power signal. Unlike a linear power supply, however, an SMPS may continually switch between operating in a full-on state and a full-off state. Regulation of the voltage provided by the SMPS is controlled by the circuit through variation of the ratio of on-to-off time. Through control of the circuit in the on state and the off state, SMPS may be substantially smaller and lighter than a linear supply due to the smaller transformer size and weight.

Circuit 100 illustrates a flyback SMPS circuit. As shown, the circuit 100 may include a power source 106 (such as mains power) connected serially with a first side of a transformer 108 and a switch 110. The second side of the transformer 108 is connected serially to a diode 112 and in parallel with a capacitor 114 and a load 116. Circuit 102 of FIG. 1B illustrates the SMPS circuit operating in an on state and circuit 104 of FIG. 1C illustrates the SMPS circuit operating in an off state. In general, when switch 110 is closed during the on state 102, energy from the power source 106 is transferred to the transformer. Further, any energy stored in the capacitor 114 may be provided to the load 116. Also during this time, the transformer 108 stores energy from the power source 106. When the switch 110 is opened, (the off state of the circuit 104) and the voltage source is removed from the circuit, energy from the transformer 108 is transmitted through the diode 112 to the load 116. In other words, during the off state 104 of the circuit, the transformer 108 is discharging its stored energy to the load 116 to power a computing device connected to the circuit. Further, energy is being stored in the capacitor 114 for use when the circuit 102 is in the on state. In this manner, by opening and closing the switch 110 of the circuit 100, the left side of the circuit 100 may charge the transformer 108 when the switch 110 is closed and discharge the energy of the transformer into the right side of the circuit when the switch is opened. This operates to alternately charge and discharge the transformer 108 to provide power to the load 116 connected to the circuit.

Figure 2B:
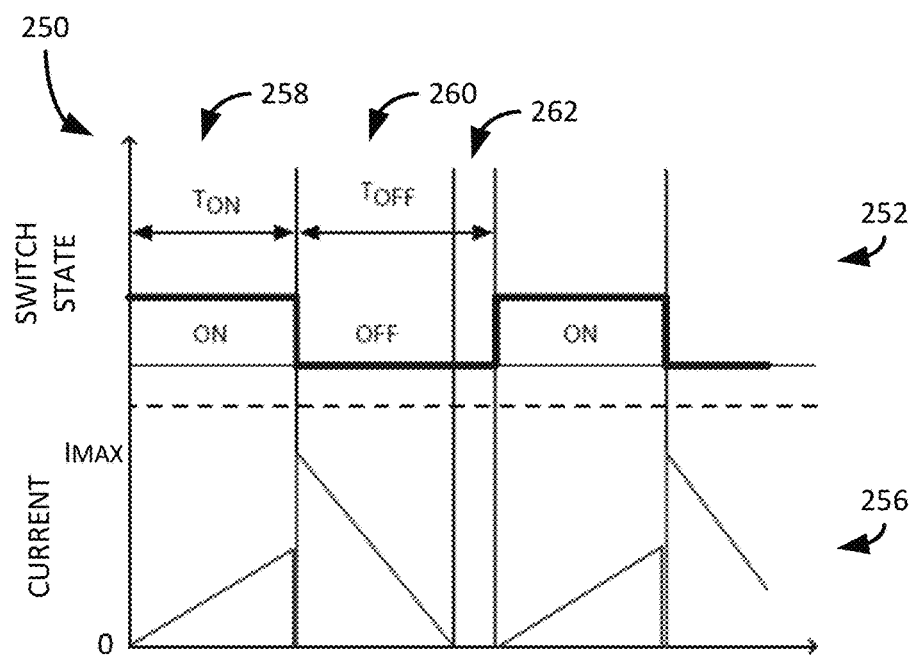
FIG. 2B is a graph illustrating the operation of a switched-mode power supply circuit that is operating in a discontinuous conduction mode

Controlling the switch 110 of the SMPS provide the different modes in which the SMPS may operate. For example, FIG. 2A is a graph illustrating the operation of a switched-mode power supply circuit that is operating in a continuous conduction mode (CCM). In general, an SMPS circuit operates in CCM if the current through the inductor never falls below zero during the off state 104. In particular, graph 200 shows the operation 202 of the switch 110 as the switch closes and opens. The operation of the switch 110 causes the SMPS circuit to alternate between an on state 208 and an off state 210. During the on state 208, the current 206 through the transformer 108 and provided to the load 116 is shown to increase. Similarly, during the off state 210, the current provided to the load 116 is shown to decrease and the capacitor 114 is depleted. Because the current 206 to the load 116 does not reach zero (the capacitor 114 always has a stored charge) in this example, the SMPS circuit is considered to be operating in CCM. Alternatively, in a discontinuous conduction mode (shown in the graph 250 of FIG. 2B), the charge stored by the capacitor 114 is allowed to fall to zero before the switch 110 is closed and the circuit enters the on state again. As shown in the graph 250, the period 262 where the capacitor 114 is depleted corresponds to a period where no voltage is applied to the load 116. Regardless of the mode in which the SMPS operates, alternating the charging and depletion of the capacitor 114 allows the SMPS to provide the power to the load without the need for massive power transformers or other power supply components.

In general, by varying the duty cycle or frequency of the operation of the switch 110, the SMPS may vary the energy stored in each cycle and control the output voltage to the load 116. In one implementation, the switching frequency of the SMPS may be fixed. The fixed frequency may be set or determined to operate the SMPS in CCM or a discontinuous mode. For example, the load requirement for a computing device may be known such that the switching frequency of the SMPS used to power the device may be fixed to operate the SMPS in CCM or discontinuous mode. As should be appreciated, the higher load requirement of a device utilizing the SMPS, the faster the stored energy of capacitor 114 of the SMPS dissipates during the off state of the circuit. In response, the switching frequency of the SMPS may be set such that the energy in the capacitor 114 does not reach zero in CCM, or such that the energy in the inductor reaches zero in a discontinuous mode but such that the computing device continues to operate. In general, the switching frequency may be set at any fixed frequency as determined by a circuit designer in response to a known or assumed load requirement of a device.

Figure 3:
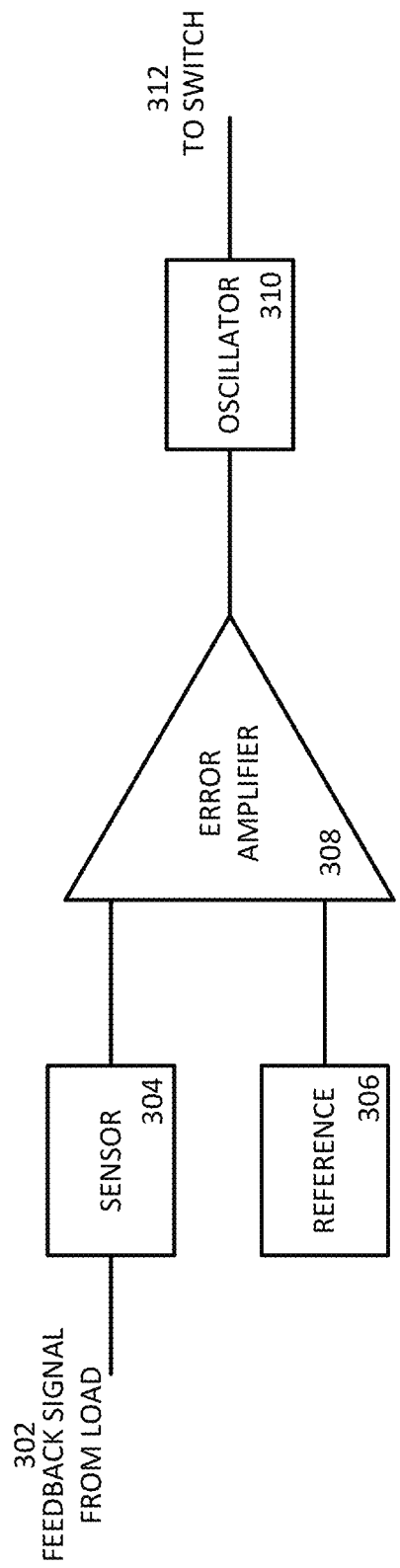
FIG. 3 is a schematic of a control circuit for a switched-mode power supply circuit.

In another implementation, the switching frequency may vary based on a measured power requirement of the load connected to the circuit. For example, FIG. 3 is a schematic of a control circuit 300 for a switched-mode power supply circuit. In general, the control circuit 300 provides a feedback mechanism of the voltage provided to the load and adjusts the switching frequency of the SMPS according to the feedback voltage. In particular, the circuit 300 includes a feedback signal from a load 302 of the SMPS as an input. The feedback signal 302 is detected by the voltage sensor 304 of the circuit and compared to a reference voltage 306 through an error amplifier 308. The reference voltage 306 may be any voltage value. In one particular implementation, the reference voltage is based on a signal from the transformer or inductor 108 of the SMPS indicating that the inductor is fully discharged. The output of the error amplifier 208 is provided to an oscillator 310 that provides a signal 312 to drive the operation of the switch 106 of the SMPS. In this manner, the operating frequency of the switch may vary in response to the load requirement of the circuit. It should be appreciated, however, that the control circuit 300 is a simplified control circuit and that more or fewer components may be included in the circuit to control the switching frequency of the SMPS.

Through the use of the switching frequency control circuit 300, the SMPS may operate in a quasi-resonant (QR) mode. In quasi-resonant switching, the SMPS does not have a fixed switching frequency. Rather, the control circuit 300 waits for a trough in the drain voltage of the circuit and then switches the SMPS into the on state. In one particular implementation, the trough in the drain voltage corresponds to the energy stored in the inductor reaching zero. Thus, the controller waits until the energy in the inductor 108 reaches zero before closing the switch to recharge the inductor. As mentioned above, the higher load requirement of a device utilizing the SMPS, the faster the stored energy of inductor 108 of the SMPS dissipates during the off state of the circuit. Thus, for lighter or smaller loads, the on time of the SMPS is smaller as less energy is required in the inductor 108 to power the load. So, for lighter loads, the switching frequency for the circuit increases. Alternatively, as the load increases, the on time of the SMPS becomes longer, resulting in a smaller switching frequency so that more energy is stored in the inductor to meet the higher load requirement.

As mentioned above, many electronic devices are approaching a peak power requirement of 2× the nominal maximum rated power of the device for short periods of time, such as during start-up of the device. However, many SMPS designs cannot achieve the 2× nominal maximum rated power requirements of the devices without a redesign or inclusion of large components. In response, implementations of the present disclosure provide circuits and methods for controlling the switching frequency of an SMPS to provide up to 2× the nominal maximum rated power to an electronic device without the need for inclusion of comparably large power components.

Figure 4:
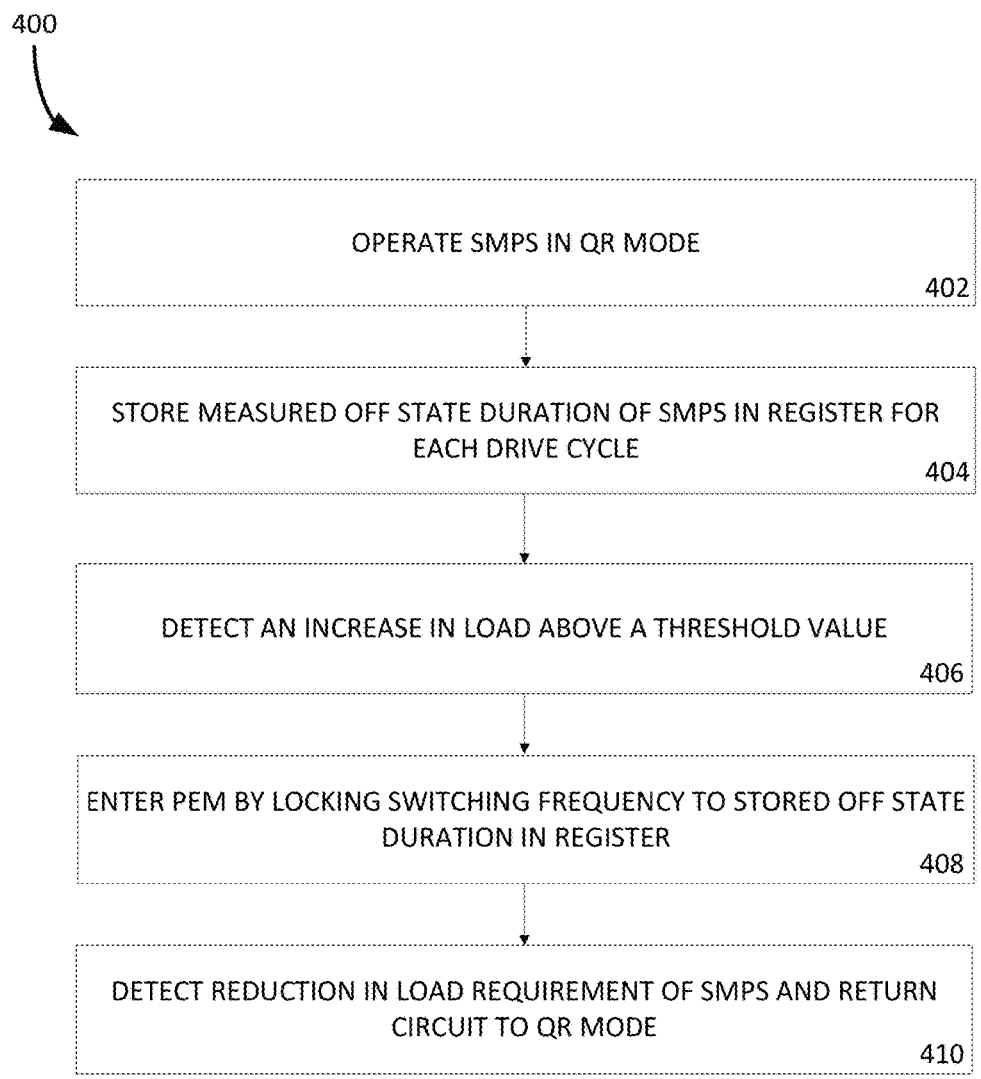
FIG. 4 is a flowchart of a method for operating a quasi-resonant switched-mode power supply circuit in a continuous conduction mode.

In particular, FIG. 4 is a flowchart of a method for operating a quasi-resonant switched-mode power supply circuit in a continuous conduction mode. The operations of the method 400 may be performed by a SMPS circuit, and more particularly by a control circuit of the SMPS for controlling the switching frequency of the circuit. Through the operations, the SMPS may provide up to a 1.5× increase in power provided to the load of the circuit while also allowing the SMPS circuit to operate in the QR mode while providing a nominal power rating to an electronic device.

Figure 5:
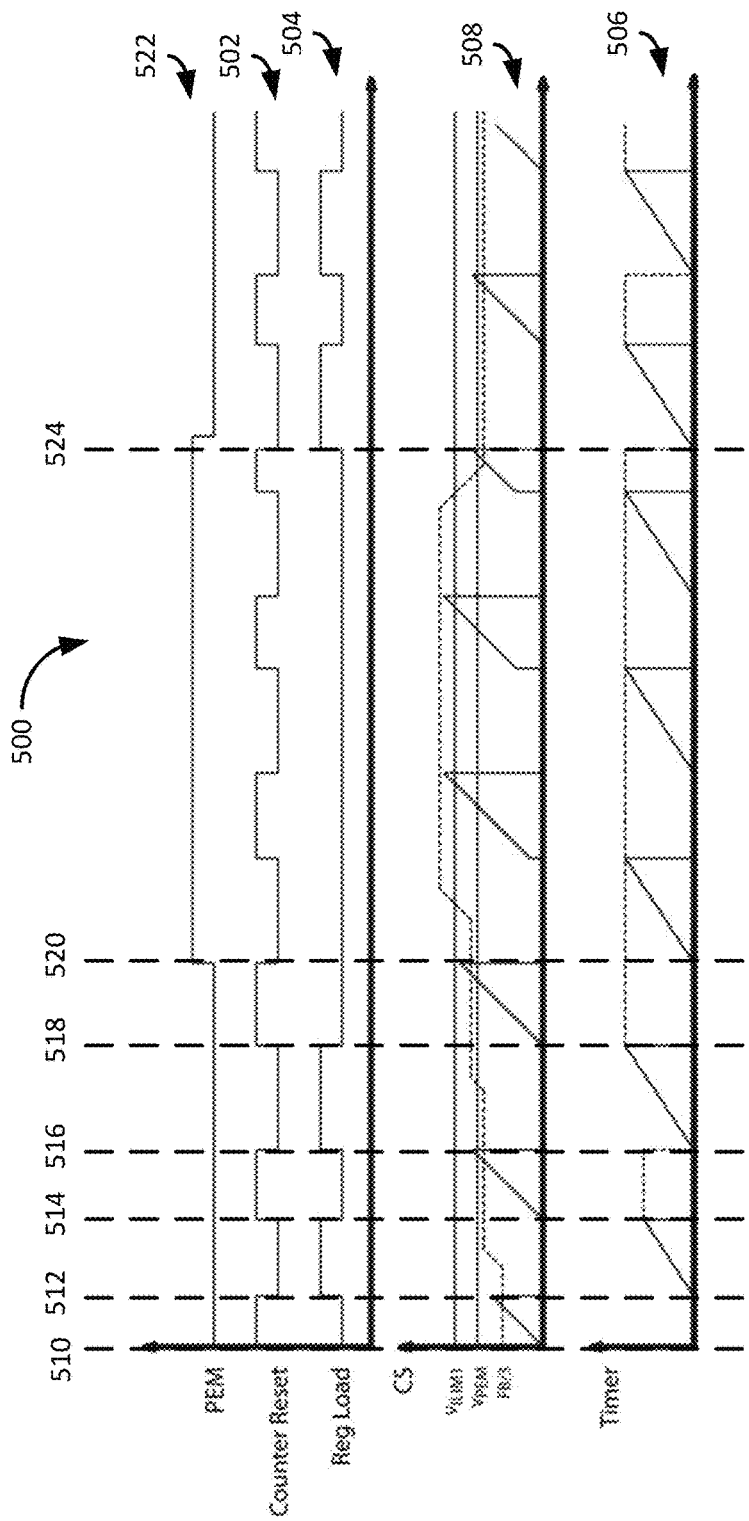
FIG. 5 is a graph illustrating the operation of a quasi-resonant switched-mode power supply circuit operating in a continuous conduction mode.

Beginning in operation 402, the SMPS may operate in a QR mode. As described above, the QR mode operates the switching between the off state and the on state of the SMPS in response to a feedback voltage provided to the load by the circuit. As such, the switching frequency during operation in the QR mode may vary depending on the power requirement of the load. Further, during this period in which the SMPS operates in the QR mode, the circuit may store a measured off time (or the time the circuit spends in the off state) in a register or other storage device. For example, FIG. 5 is a graph 500 illustrating the operation of a quasi-resonant switched-mode power supply circuit operating in a continuous conduction mode. The graph 500 includes several signals that aid in the understanding of the operation of the SMPS circuit when executing the operations of the method 400 of FIG. 4.

In particular, the graph 500 includes a counter reset signal 502, a register load signal 504, and a signal 506 indicting the operation of timer component of the circuit. A signal 508 indicating the charging of the inductor of the SMPS circuit is also provided. Initially, the SMPS is operated in a QR mode. Thus, at time 510, the circuit may enter an on state to begin charging the inductor of the circuit. This is reflected in the graph 500 by the power signal 508 increasing from time 510 to time 512. At time 512 and in response to a feedback voltage provided to a switching control circuit, the circuit enters the off state such that the charging of the inductor is stopped (signal 508). During the off state, the counter reset signal 502 is de-asserted and the register load signal 504 is asserted to begin counting the duration of the off time. Thus, as seen in signal 506, the counter increments beginning at time 512.

At time 514, the SMPS circuit, in response to a feedback voltage while operating in QR mode, closes the switch of the circuit to enter the on state to begin recharging the inductor (as seen by signal 508 from time 514 to time 516). Also during the time period 514 to 516, the measured value of the timer 506 is stored in a register, as shown in period 508 of the timer signal. Also illustrated in the graph 500, the power provided to the inductor during time period 514 to 516 is larger than the previous period of charging. In one implementation, the additional charging of the inductor may be in response to a higher load applied to the circuit.

After time 516, the circuit again enters the off state. Similar to above, the circuit begins counting the duration of the off state from time 516 until the circuit once again enters the on state. In this manner, the circuit may operate to charge and discharge the inductor of the circuit while measuring the duration of each occurrence of the off state and storing the measured duration in the register. Because the SMPS is operating the QR mode, the length of the off state may vary from cycle to cycle.

At time 518, a measured off state duration is stored in the register as described above and a charging period of the inductor begins. However, the charging of the inductor during time period 518 to 520 may cause the power stored in the inductor to exceed a voltage threshold. In general, an increase in the load on the SMPS may cause the switching frequency to be lower in response to the additional power requirements of the load when the SMPS operates in the QR mode. However, in operation 406, the circuit may detect an increase in a load requirement for the circuit that has exceeded a threshold value. Upon exceeding the threshold value, the circuit may enter a power excursion mode (PEM). During the PEM, the circuit may cease operating in a QR mode and transition into a CCM such that the switching frequency of the circuit becomes fixed. In one particular implementation, the switching frequency of the circuit in the PEM is controlled by the last stored off state duration value in the register.

More particularly, the circuit enters the PEM by locking the switching frequency of the circuit to the stored value in the register in operation 408. Turning to the graph 500 of FIG. 5, an asserted PEM signal 522 indicates that the circuit has entered the PEM state. During the PEM, the register load signal 504 is de-asserted so that no additional values are stored in the register. The SMPS is then operated at a switching frequency of the last stored value 506 in the register. In particular, the off time for every cycle of the circuit is set at the last saved off time duration in the register such that the switching frequency is locked to the stored value. This allows the circuit to operate in a continuous conduction mode and maintain a large stored power value in the inductor in response to the higher load power requirements.

At a later time 524, the circuit detects that the load power requirement has returned to within the nominal power requirement of the circuit based on feedback voltage received from the inductor in operation 410. At this time, the circuit leaves the PEM (as shown in the de-asserted PEM signal 522) and the circuit returns to operating in the QR mode as described above. Thus, the circuit returns to measuring the off state duration for each cycle and storing the off state duration in the register.

Through the operations of the method 400 of FIG. 4, the SMPS may enter a CCM when the load power requirement exceeds a threshold value. Through this method, the peak current allowed to the load increases up to 25%, which allows the circuit to provide up to 1.5×× the nominal maximum rated power of the SMPS circuit. However, some electronic devices may require up to 2.0× the nominal maximum power rating for the circuit. To provide this additional power over the maximum power rating, the circuit may also employ an adaptive off time modulation procedure during the PEM described above. By reducing the off time when in PEM, the valley current that triggers the on time increases resulting in more average current delivered to the load.

Figure 6:
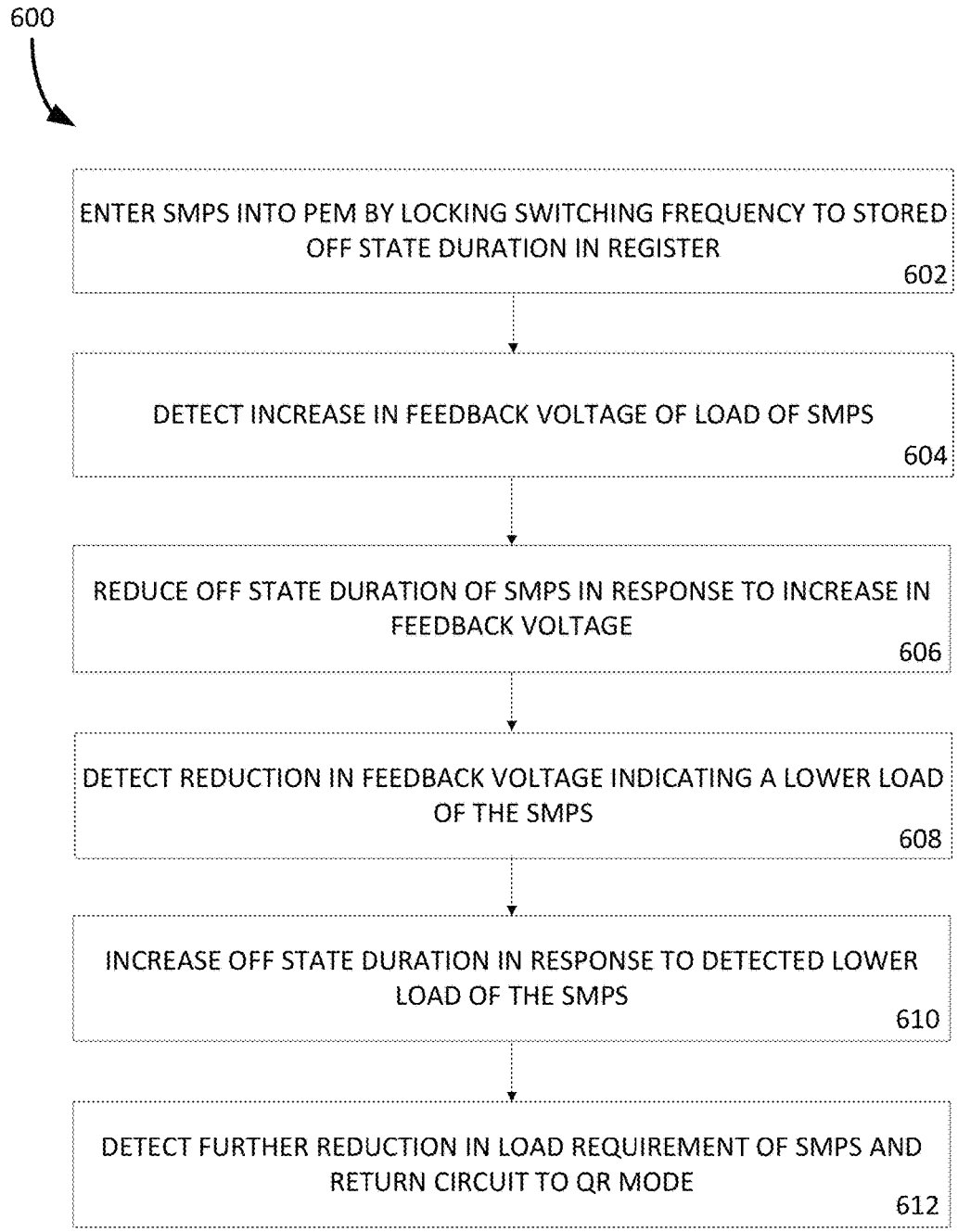
FIG. 6 is a flowchart of a method for operating a quasi-resonant switched-mode power supply circuit in a continuous conduction mode with an adaptive modulation of the off-time of a switch of the circuit.

FIG. 6 is a flowchart of a method for operating a quasi-resonant switched-mode power supply circuit in a continuous conduction mode with an adaptive modulation of the off-time of a switch of the circuit. Similar to the flowchart described above, the operations of the method 600 of FIG. 6 may be performed by a SMPS circuit, and more particularly by a control circuit of the SMPS for controlling the switching frequency of the circuit. Through the operations, the SMPS may provide up to a 2.0× increase in power provided to the load of the circuit while also allowing the SMPS circuit to operate in the QR mode while providing a nominal power rating to an electronic device.

Figure 7:
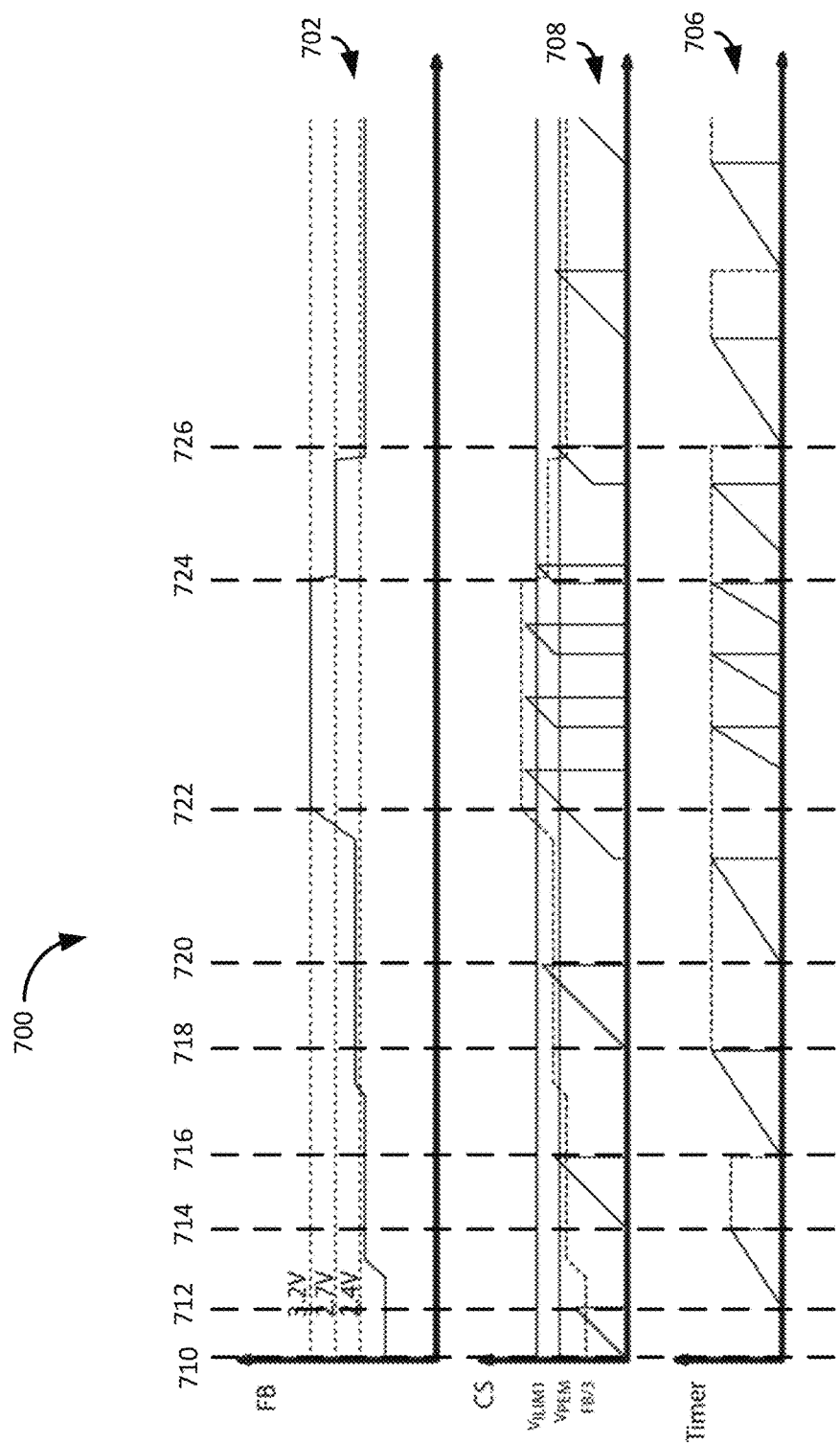
FIG. 7 is a graph illustrating the operation of a quasi-resonant switched-mode power supply circuit in a continuous conduction mode with an adaptive modulation of the off-time of a switch of the circuit.

Beginning in operation 602, the SMPS circuit operates in a QR mode, as well as entering PEM when the power stored in the inductor exceeds a voltage threshold based on an increase in the load on the SMPS. This operation of operating in the QR mode and transitioning into PEM when the load increases is described above with relation to FIGS. 4 and 5. The operation may also be understood through the timing diagram of FIG. 7. In particular, FIG. 7 is a graph illustrating the operation of a quasi-resonant switched-mode power supply circuit in a continuous conduction mode with an adaptive modulation of the off-time of a switch of the circuit. Portions of the timing diagram are similar to that described above with relation to the timing diagram of FIG. 5. Thus, during time 710-720, the SMPS operates in a QR mode and stores the off time duration in a register as described. At time 720, the stored power in the inductor of the SMPS exceeds the threshold voltage such that circuit enters PEM. In the PEM, the duration of the off state of the circuit is controlled by the stored duration in the register.

In operation 604, the SMPS, while operating in the PEM, detects a higher load requirement based on an increase in the feedback voltage. The feedback voltage is illustrated in the diagram 700 of FIG. 7 as feedback signal 702. At time 722, the feedback voltage signal 702 indicates a higher load requirement. In this example, the feedback voltage increases from 2.4 V to 3.2 V at time 722. The circuit may detect this increase at the load and respond accordingly.

In particular, the circuit may reduce the off time duration of the circuit in response to the detected increase in feedback voltage. By reducing the off time duration of the circuit in response to the increased load, the switching frequency of the SMPS is increased and more power is delivered to the inductor and load. During this period, the SMPS may still operate in a CCM in that the switching frequency is fixed. However, rather than being fixed at the last stored value in the register, the switching frequency may be increased above the last stored value in response to the higher load requirement. In essence, the PEM switching frequency is sped up by the circuit in response to the detected higher load.

The sped up switching frequency is illustrated in the timing diagram 700 of FIG. 7. In particular, the increase in the feedback voltage is detected at time 722. In response, the timer signal 706 is sped up such that the maximum off time (or the duration the circuit remains in the off state) increases. As shown, between time 722 and time 724, the timer signal 706 of the circuit is sped up. By increasing the switching frequency of the circuit, the power applied to the inductor (shown in signal 708) increases. In other words, because the circuit shortens the off state duration, the inductor is not allowed to dissipate the stored energy before the next drive cycle begins. In this manner, the power provided to the inductor remains high for as long as the higher load is detected.

In one particular implementation, the maximum off state duration is reduced by one-half the stored time in the register. For example, if the stored off state duration is 10 ms, the circuit may increase the switching frequency in response to a detected higher load by reducing the off state duration to 5 ms. In general, the scaling factor is exponentially proportional to the negative difference between the current feedback voltage and the PEM threshold feedback voltage. Thus, by reducing the off state duration by 0.5 (or doubling the switching frequency), the output power may be increased up to 2.0× the nominal maximum power of the circuit. However, it should be appreciated that the switching frequency may be increased by any scaling factor. Reducing the off state duration by 0.5 is but one example of altering the switching frequency in response to the higher detected load.

The SMPS may continue to operate in the scaled off state duration for any amount of time. In one implementation, the SMPS stays in the scaled PEM for as long as the feedback voltage remains high. At some later time, the load requirement may become less. For example, at time 724 the feedback voltage (signal 702) may decrease indicating that the load requirement has dropped. The circuit may detect the drop in feedback voltage in operation 608. In operation 610, the circuit may decrease the switching frequency in response to the detected feedback voltage. In one implementation, the off state duration of the SMPS returns to the stored value in the register as described above with reference to the PEM state of the circuit. However, the switching frequency may be slowed down to any value by the circuit in response to a drop in the feedback voltage from the load. The increase in the off state duration is illustrated in the timer signal 706 between time 724 and time 726.

At still a later time, the circuit may detect a further reduction in the feedback voltage indicating an even lower load on the circuit. For example, at time 726 of the diagram 700, the circuit may detect a drop in the feedback voltage below the threshold value for entering the PEM. The circuit, in operation 712, may detect the drop in the feedback voltage below the threshold voltage for entering the PEM and, in response, may return the SMPS circuit into the QR mode. In the QR mode, off state duration for the circuit is set in response to the feedback voltage and is stored in the register at each drive cycle of the circuit. As such, through the operations of the method 600 of FIG. 6, the circuit may operate in a QR mode, enter the PEM when the feedback voltage exceeds the threshold value, and increase the switching frequency in response to a further increase in the load of the circuit. Through this scaled frequency response to the feedback voltage, the circuit may provide up to 2.0× the nominal maximum power rating for the SMPS in response to load requirements.

Figure 8:
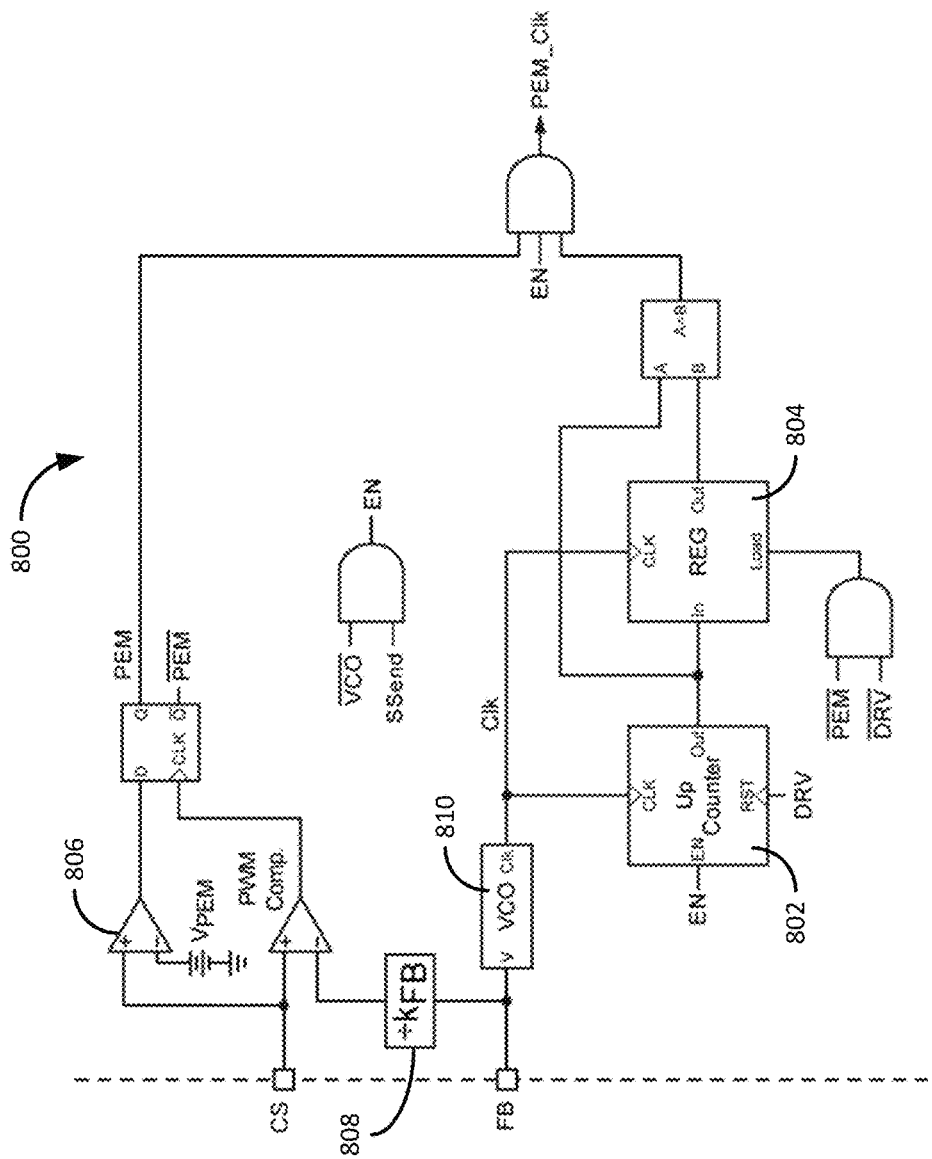
FIG. 8 is a schematic of a control circuit 800 for a switched-mode power supply circuit to operate the circuit through a scaled switching frequency.

FIG. 8 is a schematic of a control circuit 800 for a switched-mode power supply circuit to operate the circuit through a scaled switching frequency. Although shown in FIG. 8 and discussed herein as including particular components and connected as shown, it should be appreciated that more or fewer components may be utilized in the circuit 800 and such components may be connected in many different variations. Those of skill in the art will recognize the many ways in which a circuit may be created to perform one or more of the operations of the methods described herein. As such, the circuit 800 of FIG. 8 is but one example of a control circuit for an SMPS to perform the operations described above.

In general, the circuit 800 includes a plurality of circuits for performing the operations described above. For example, the circuit 800 includes a timer circuit 802 for measuring the duration of the off state of the SMPS. In one embodiment, the timer circuit 802 includes an up counter driven by one or more control signals to increment during the off state of the SMPS. A register may be connected or otherwise in communication with a register circuit 804. The register 804 may also be controlled by one or more control signals, such as a "load" signal to load into the register a signal or value on the input pin of the register. In one implementation, the output of the timer circuit 802 is input and stored in the register 804 for use in setting a switching frequency of the SMPS during PEM of the circuit. Further, a clock signal to control the frequency of operation of the timer circuit 802 and/or the register 804 may be provided by an oscillator circuit 810, as shown by the output of the oscillator circuit as the clock input to the timer circuit and the register in the circuit 800 of FIG. 8.

In addition, the circuit 800 may include a scaling calculation circuit 808 to calculate a scaling factor to apply to a switching frequency based on a feedback voltage provided to a load of the SMPS. The calculated scaling factor from the calculation circuit 808 is utilized by the SMPS to scale the switching frequency of the SMPS when a high load condition is detected while operating in the PEM. Similarly, the circuit may include a peak power excursion detection circuit 806. The peak power excursion circuit 806 detects when the peak power in the inductor of the SMPS exceeds a threshold value, illustrated as input $V_{PEM}$ to the comparator 806 in the circuit 800. The output of the peak power excursion circuit 806 may be utilized by the circuit 800 to cause the SMPS to enter the PEM from the QR mode when the stored power in the inductor exceeds the threshold voltage and to return to the QR mode from the PEM when the stored power drops below the threshold voltage. In general, all of the components of the circuit 800 discussed above may be utilized to control the switching frequency of an SMPS to provide 2.0× the nominal maximum power rating of the circuit, without the need for larger storage devices integrated into the SMPS circuit.

It should be noted that the flowcharts of FIGS. 4 and 6 are illustrative only. Alternative embodiments of the present invention may add operations, omit operations, or change the order of operations without affecting the spirit and scope of the present invention. The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

Various documents, including patents and patent applications, have been incorporated by reference into this application. In case of any conflict between an incorporated document and the present application, the present application, including any definitions herein, will control.

We claim:

1. A method for controlling a switched-mode power supply, the method comprising:
    measuring and storing a switch off-time duration during a nominal load condition of the switched-mode power supply;
    detecting a peak power excursion condition of the switched-mode power supply;
    setting a switching frequency of the switched-mode power supply by equating an off-time of the switch to the stored off-time duration;
    detecting an increase in the load requirement during the peak power excursion condition; and
    adjusting the off-time of the switched-mode power supply by a scaling factor in response to a change in load condition during the detected peak power excursion condition.

2. The method of claim 1 further comprising:
utilizing a counter circuit to time the switch off-time duration of the switched-mode power supply on each drive cycle of the switched-mode power supply.

3. The method of claim 2 wherein the switch off-time duration is stored in a register in communication with the counter circuit.

4. The method of claim 1 wherein detecting the high power load condition comprises receiving a feedback signal from a control circuit of the switched-mode power supply that exceeds a threshold value.

5. The method of claim 4 further comprising:
calculating the scaling factor utilizing a calculation circuit.

6. The method of claim 5 wherein the feedback signal is a voltage and the scaling factor is inversely proportional to the feedback signal from the load of the switch-mode power supply.

7. The method of claim 5 wherein the feedback signal is a current and the scaling factor is directly proportional to the feedback signal from the load of the switch-mode power supply.

8. The method of claim 1 wherein the switched-mode power supply operates in a quasi-resonant operating mode prior to the detection of the peak power excursion condition.

9. The method of claim 1 wherein the switched-mode power supply operates in a continuous conduction operating mode for at least some of the peak power excursion condition.

10. The method of 1 further comprising:
operating the switched-mode power supply at the scaled switching frequency such that a next drive cycle of the switched-mode power supply does not occur until a scaled off-time duration is reached.

11. The method of claim 1 further comprising:
detecting a return to the nominal load condition of the switched-mode power supply; and
operating the switched-mode power supply in a quasi-resonant mode.

12. A control circuit for a switched-mode power supply, the control circuit comprising:
a switch controller for operating the switched-mode power supply in an on-state or an off-state;
a counter circuit for timing a duration of an off-state during a nominal load condition of the switched-mode power supply;
a register in communication with the counter circuit for storing the off-time duration during the nominal load condition; and
a peak power excursion detection circuit for detecting a peak power excursion condition of the switched-mode power supply;
wherein a switching frequency of the switch controller is based on the off-time duration stored in the register after the peak power excursion condition of the switched-mode power supply is detected.

13. The control circuit of claim 12 further comprising:
a calculation circuit for calculating a scaling factor of the switching frequency based at least on a feedback signal from a load of the switched-mode power supply.

14. The control circuit of claim 13 wherein the peak power excursion detection circuit detects a further increase in a load requirement on the switched-mode power supply and, in response, the off-time duration of the switch controller is adjusted based at least on the calculated scaling factor.

15. The control circuit of claim 14 wherein the adjusted off-time duration of the switch controller based at least on the calculated scaling factor is shorter than the off-time duration stored in the register.

16. The control circuit of claim 14 wherein the switched-mode power supply operates at the scaled switching frequency such that a next on-state of the switched-mode power supply does not occur until a scaled off-time duration is reached.

17. The control circuit of claim 13 wherein the feedback signal is a voltage and a measurement of the feedback voltage above a threshold voltage value indicates the peak power excursion condition of the switched-mode power supply.

18. The control circuit of claim 13 wherein the feedback signal is a current and a measurement of the feedback current above a threshold voltage value indicates the peak power excursion condition of the switched-mode power supply.

19. The control circuit of claim 13 wherein the feedback signal is a voltage and the scaling factor is inversely proportional to the feedback signal from a load of the switch-mode power supply.

20. The control circuit of claim 13 wherein the feedback signal is a current and the scaling factor is directly proportional to the feedback signal from a load of the switch-mode power supply.

21. The control circuit of claim 12 wherein the switching frequency of the switched-mode power supply is a quasi-resonant frequency when the peak power excursion condition is not detected.

22. A switched-mode power supply circuit for powering a load, the switched-mode power supply circuit comprising:
a switching circuit for operating the switched-mode power supply in an on-state or an off-state, wherein power is stored in a power storage circuit during the on-state;
a switch controller for operating the switching circuit such that the switched-mode power supply alternates between the on-state and the off-state at a switching frequency;
a counter circuit for timing a duration of a particular off-state during a nominal load condition of the switched-mode power supply;
a register in communication with the counter circuit for storing the off-time duration of the particular off-state during the nominal load condition; and
a peak power excursion detection circuit for detecting a peak power excursion condition of the switched-mode power supply;
wherein the a off-time of the switch controller is based on the off-time duration stored in the register after the peak power excursion condition of the switched-mode power supply is detected.

23. The switched-mode power supply circuit of claim 22 further comprising:
a calculation circuit for calculating a scaling factor of the off-time duration based at least on a feedback signal from a load of the switched-mode power supply.

24. The switched-mode power supply circuit of claim 23 wherein the peak power excursion detection circuit detects a further increase in a load requirement on the switched-mode power supply and, in response, the off-time duration of the switch controller is adjusted based at least on the calculated scaling factor.

25. The switched-mode power supply circuit of claim 22 wherein the feedback signal is a voltage and the scaling factor is inversely proportional to the feedback signal from a load of the switched-mode power supply.

26. The switched-mode power supply circuit of claim 22 wherein the feedback signal is a current and the scaling factor is directly proportional to the feedback signal from a load of the switched-mode power supply.

* * * * *